(12) United States Patent
Stovall

(10) Patent No.: US 9,119,343 B1
(45) Date of Patent: Sep. 1, 2015

(54) RAIL-MOUNTED AUTOMATED GRASS CUTTER

(71) Applicant: Daniel R. Stovall, Newalla, OK (US)

(72) Inventor: Daniel R. Stovall, Newalla, OK (US)

( * ) Notice: Subject to any disclaimer, the term of this patent is extended or adjusted under 35 U.S.C. 154(b) by 107 days.

(21) Appl. No.: 14/083,836

(22) Filed: Nov. 19, 2013

(51) Int. Cl.
*A01D 34/02* (2006.01)
*A01D 34/06* (2006.01)
*A01B 69/04* (2006.01)
*A01D 34/00* (2006.01)

(52) U.S. Cl.
CPC .............. *A01D 34/06* (2013.01); *A01B 69/008* (2013.01); *A01D 34/008* (2013.01)

(58) Field of Classification Search
USPC .............. 56/230–232; 180/401; 104/245–247
See application file for complete search history.

(56) References Cited

U.S. PATENT DOCUMENTS

| | | | | |
|---|---|---|---|---|
| 72,263 A | * | 12/1867 | Boicourt | |
| 420,825 A | * | 2/1890 | Nacey | 56/232 |
| 867,765 A | * | 10/1907 | Strickler | 104/246 |
| 2,836,129 A | * | 5/1958 | Jaeger | 104/120 |
| 3,052,076 A | * | 9/1962 | Bambi | 56/16.7 |
| 4,180,964 A | | 1/1980 | Pansire | |
| 4,347,908 A | | 9/1982 | Anderson | |
| 4,831,813 A | | 5/1989 | Jonas et al. | |
| 5,174,219 A | * | 12/1992 | Streiff | 105/199.4 |
| 5,449,264 A | * | 9/1995 | Poletto | 414/391 |
| 5,947,347 A | | 9/1999 | Cline, Sr. | |
| 6,300,737 B1 | | 10/2001 | Bergvall et al. | |
| 6,418,855 B1 | * | 7/2002 | Fischer | 104/118 |
| D504,901 S | | 5/2005 | Wickstrom et al. | |

* cited by examiner

*Primary Examiner* — Alicia Torres
(74) *Attorney, Agent, or Firm* — Kyle A. Fletcher, Esq.

(57) ABSTRACT

The automated grass cutter is a sickle mower that is driven along a rail in order to autonomously cut grass. The automated grass cutter places a rail of an undefined length or track, which is supported via fence posts. A drive wheel system is engaged onto the rail in order to drive the sickle grass mower along the rail. The fence posts may include a fence rail spanning between consecutive fence posts. The sickle grass mower extends laterally from the rail, and relies on a drive motor to drive the drive wheel system and sickle mower along the rail. The sickle mower includes a reciprocating blade that reciprocates back and forth via movement of guide wheels.

12 Claims, 4 Drawing Sheets

RAIL-MOUNTED AUTOMATED GRASS CUTTER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of grass cutting machinery, more specifically, an automated machine that cuts grass.

B. Discussion of the Prior Art

As will be discussed immediately below, no prior art discloses an automated grass cutter that travels along a rail or track of an undefined length, and which is supported via fence posts. A drive wheel system is engaged onto said rail in order to drive a sickle grass mower along said rail. The fence posts may include a fence rail spanning between consecutive fence posts for added support. The sickle grass mower extends laterally from the rail, and relies on a drive motor to drive the drive wheel system and sickle mower along the rail. The sickle mower includes a reciprocating blade that reciprocates system utilizes a series of wheels that engage the left side and right side of the rail in order to ensure alignment of the sickle mower when driven along the rail. A drive wheel is engaged against two adjacent guide wheels in order to propel the drive wheel system along the rail. The drive wheel is in mechanical connection with a motor that is seated atop of the drive wheel system.

The Anderson Patent (U.S. Pat. No. 4,347,908) discloses an apparatus in which a self-propelled vehicle is caused to traverse a terrain by following a line arranged over the terrain in a predetermined manner. However, the self-propelled vehicle does not utilize a sickle mower that is self-propelled and otherwise open to span across a predetermined path.

The Jonas et al. Patent (U.S. Pat. No. 4,831,813) discloses a system for automatic performance of agricultural tasks such as lawn mowing, which includes a ground inserted rail type system. However, the lawn mowing function does not rely on a sickle mower that is guided along a rail.

The Bergvall et al. Patent (U.S. Pat. No. 6,300,737) discloses an electronic bordering system, which may be used with a robot lawn mower. However, the robot lawn mower is not a sickle mower that is driven along a rail.

The Pansire Patent (U.S. Pat. No. 4,180,964) discloses a fully automatic self-propelled self-guiding lawn mower in which guidance of the lawn mower is based on the principal of a magnet following a passive ribbon or wire of ferromagnetic material. However, the lawn mower relies on magnets or passive ribbon, and not a rail system to guide a sickle lawn mower along.

The Nelson Patent (U.S. Pat. No. 5,974,347) discloses a method for controlling the operation of an automated vehicle in accordance with stored coordinate information compared with calculated coordinate position determined from the solution of simultaneous circle equations. Again, the method relies on wireless communication in order to navigate a lawn mower.

SUMMARY OF THE INVENTION

The automated grass cutter is a sickle mower that is driven along a rail in order to autonomously cut grass. The automated grass cutter places a rail of an undefined length or track, which is supported via fence posts. A drive wheel system is engaged onto said rail in order to drive the sickle grass mower along said rail. The fence posts may include a fence rail spanning between consecutive fence posts. The sickle grass mower extends laterally from the rail, and relies on a drive motor to drive the drive wheel system and sickle mower along the rail. The sickle mower includes a reciprocating blade that reciprocates back and forth via movement of guide wheels. The drive wheel system utilizes a series of wheels that engage the left side and right side of the rail in order to ensure alignment of the sickle mower when driven along the rail. A drive wheel is engaged against two adjacent guide wheels in order to propel the drive wheel system along the rail. The drive wheel is in mechanical connection with a motor that is seated atop of the drive wheel system.

It is an object of the invention to provide an automated grass cutter that is driven along a rail in order to autonomously cut grass via a sickle mower.

A further object of the invention is to provide a rail that forms a line or track along which a sickle lawn mower shall travel autonomously.

A further object of the invention is to provide a drive wheel system that attaches to the rail, and from which the sickle lawn mower extends laterally.

These together with additional objects, features and advantages of the automated grass cutter will be readily apparent to those of ordinary skill in the art upon reading the following detailed description of presently preferred, but nonetheless illustrative, embodiments of the automated grass cutter when taken in conjunction with the accompanying drawings.

In this respect, before explaining the current embodiments of the automated grass cutter in detail, it is to be understood that the automated grass cutter is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the automated grass cutter.

It is therefore important that the claims be regarded as including such equivalent construction insofar as they do not depart from the spirit and scope of the automated grass cutter. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
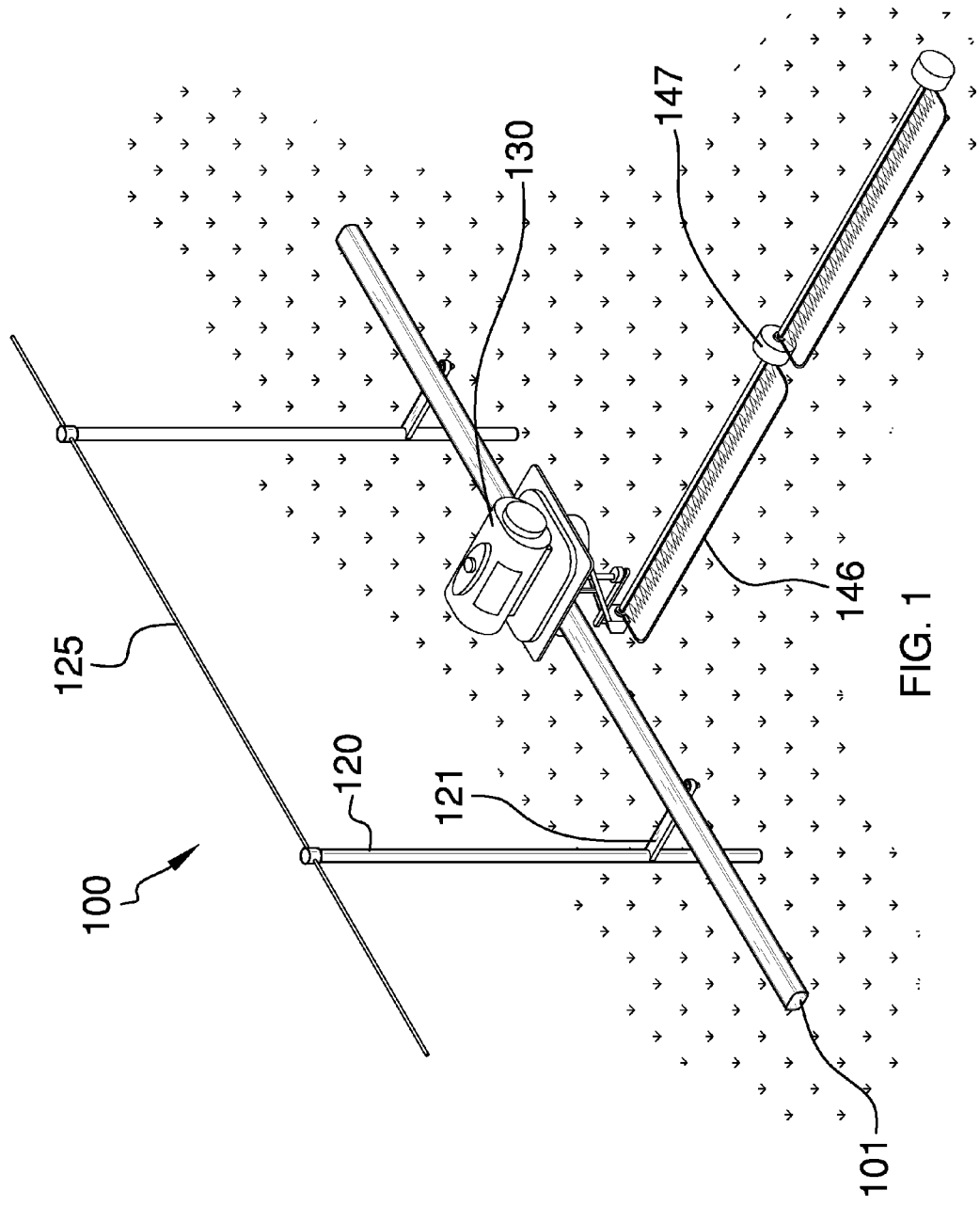
FIG. 1 illustrates a perspective view of the automated grass cutter.
Figure 2:
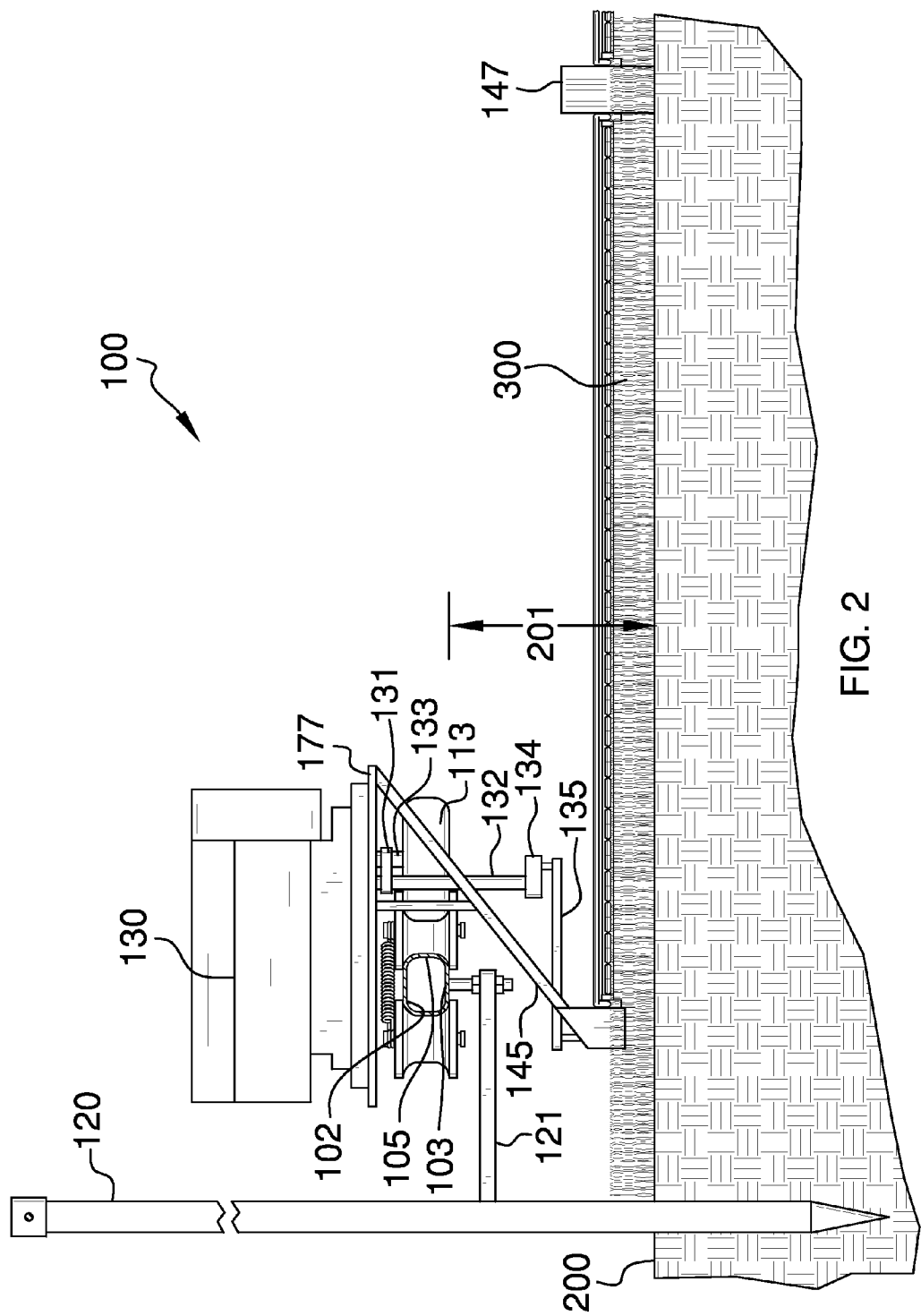
FIG. 2 illustrates a side view of the automated grass cutter.
Figure 3:
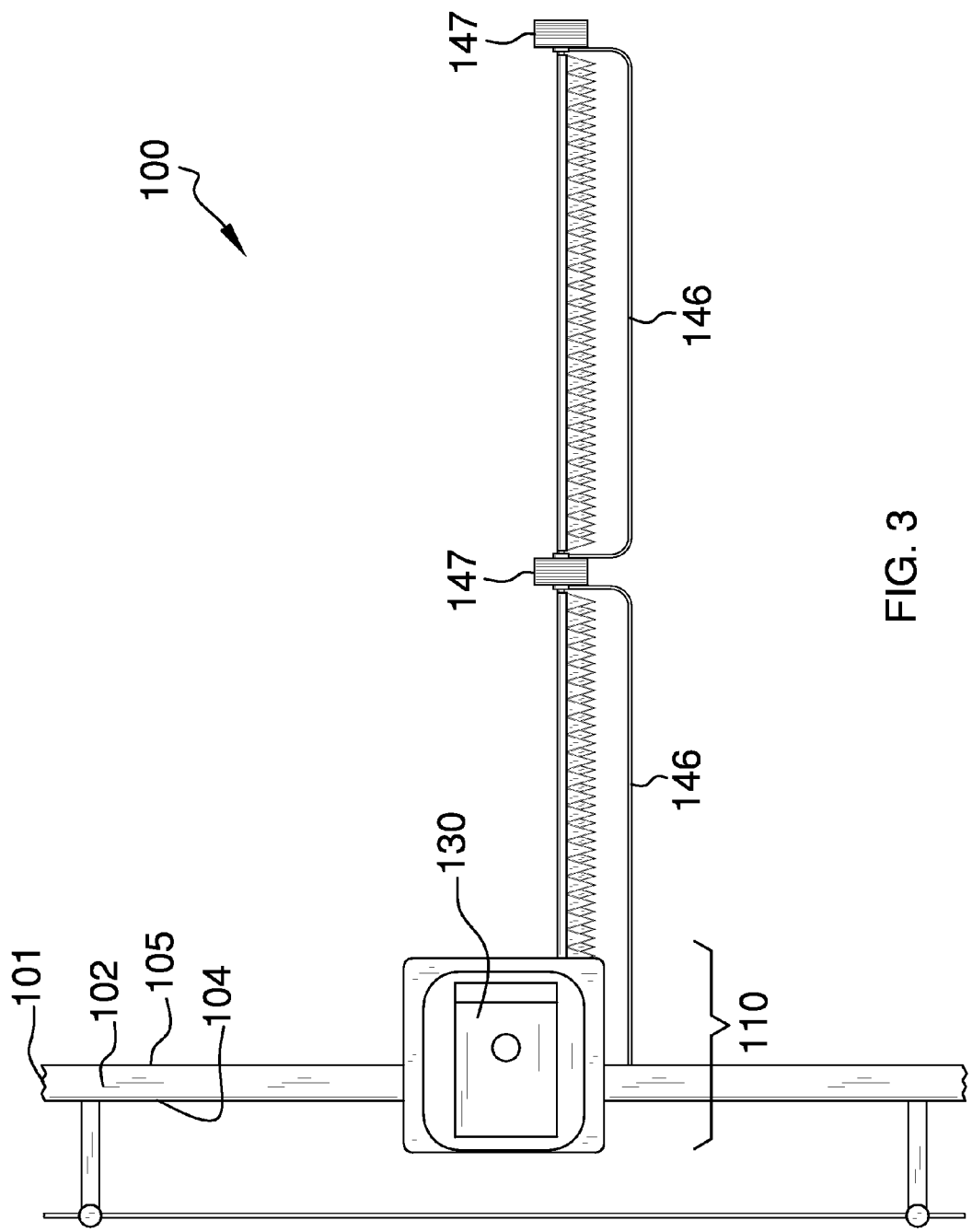
FIG. 3 illustrates a top view of the automated grass cutter.
Figure 4:
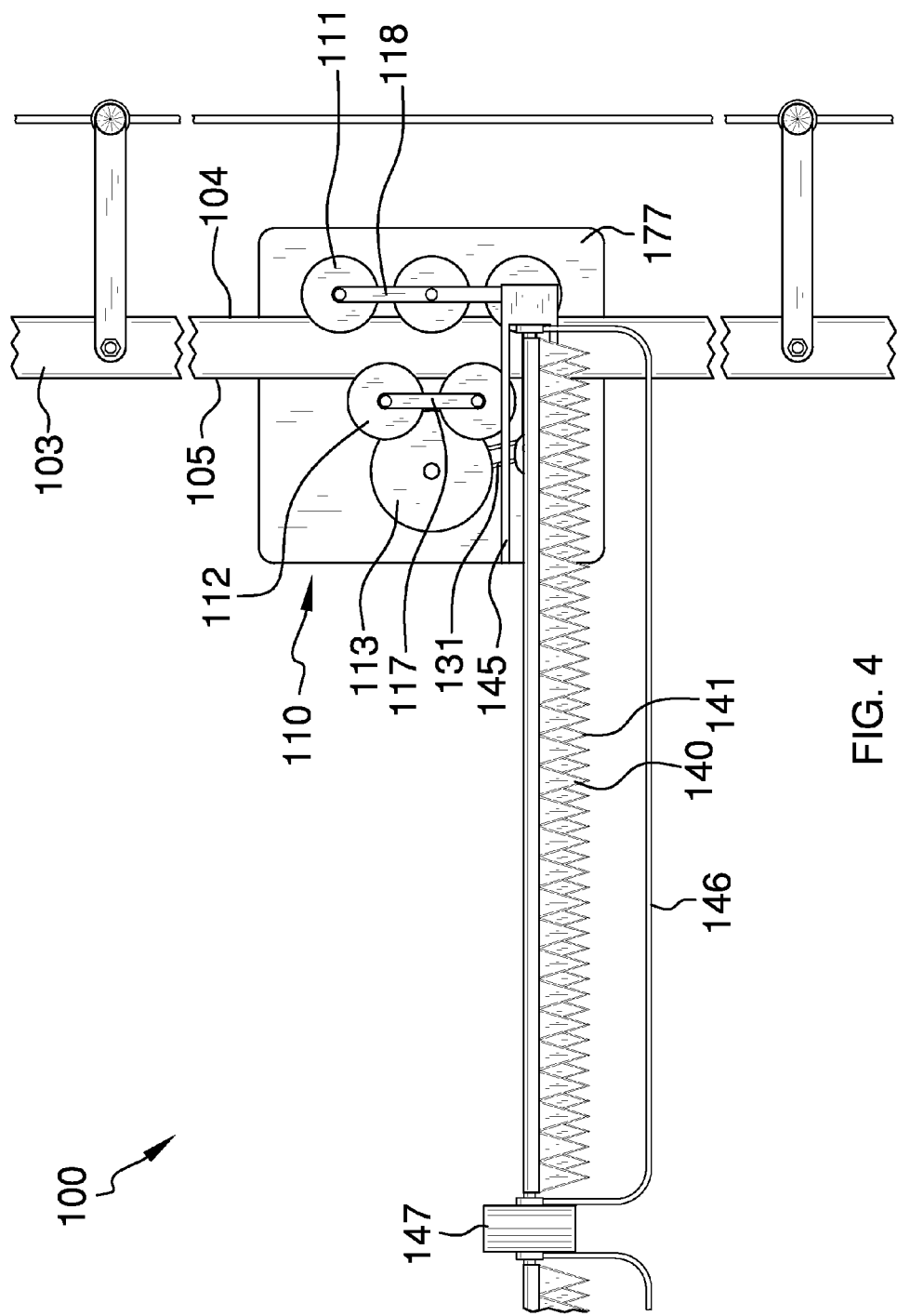
FIG. 4 illustrates a bottom view of the automated grass cutter.

Detailed reference will now be made to the preferred embodiment of the present invention, examples of which are illustrated in FIGS. 1-4. An automated grass cutter 100 (hereinafter invention) includes a rail 101 further defined with a top surface 102, bottom surface 103, inner surface 104, and outer surface 105. The rail 101 has a generally squared-shape when looking at FIG. 2. The rail 101 is of an undefined length, and may have turns or be linear. Moreover, the rail 101 is the path of use of the invention 100, and enables a drive wheel system 110 to connect thereon.

The rail 101 is held in place via fence posts 120. The fence posts 120 are inserted into a ground surface 200, and include a rail arm 121 that is perpendicularly-oriented with respect to the fence post 120. Moreover, the fence post 120 and the rail arm 121 support the rail 101 at an elevation 201 above the ground surface 200. Fence rails 125 may span between two consecutive fence posts 120.

The drive wheel system 110 includes a series of inner guide wheels 111 as well as a series of outer guide wheels 112. The inner guide wheels 111 engage the inner surface 104 of the rail 101 whereas the outer guide wheels 112 engage against the outer surface 105 of the rail 101. The outer guide wheels 112 include an outer bracket 117 that linearly connect to all of the outer guide wheels 112. The inner guide wheels 111 include an inner bracket 118 that connects across all of the inner guide wheels 111. The drive wheel system includes a drive wheel 113 that is engaged against two adjacent outer guide wheels 112. The drive wheel 113 is responsible for propelling the drive wheel system 110 along the rail 101. The drive wheel 113 is in mechanical connection with a drive motor 130 via a drive wheel belt 131. The drive motor 130 is mounted atop of a motor plate 177.

A plurality of spring members 114 traverse between the inner guide wheels 111 and the outer guide wheels 112 to insure adequate contact of the drive wheel system 110 to the rail 101. The spring members 114 ensure that the inner guide wheels 111 and the outer guide wheels 112 are able to maintain traction to the rail 101 regardless of whether the rail 101 has a curve or is linear. The spring members 114 span across and above the rail 101 so as to not interfere with the rail arms 121 that are periodically spaced along the length of the rail 101.

The drive wheel belt 131 extends from a drive motor shaft 132 to a drive wheel shaft 133. The drive motor shaft 132 extends down from the drive motor 130 to a sickle blade gear 134, which is positioned underneath the drive wheel system 110. The sickle blade gear 134 attaches to a sickle idler arm 135. The sickle idler arm 135 is responsible for translating rotational motion of the sickle blade gear 134 to a back and forth motion. The sickle idler arm 135 connects to a sickle mower blade 140 such that the sickle idler arm 135 moves the sickle mower blade 140 back and forth whilst a stationary mower blade 141 remains motionless. The sickle mower blade 140 and the stationary mower blade 141 collectively form the grass cutting feature of the invention 100. The sickle mower blade 140 and the stationary mower blade 141 are supported via a mower blade brace 145.

A guard 146 is utilized to support both the sickle mower blade 140 and the stationary mower blade 141. Moreover, the guard 146 is positioned in front of the sickle mower blade 140 and the stationary mower blade 141. A mower wheel 147 is provided at a distal end of the sickle mower blade 140 and the stationary mower blade 141. The mower wheel 147 is included to insure proper support of the sickle mower blade 140 and the stationary mower blade 141. The motor wheel 147 also ensures that the sickle mower blade 140 and the stationary motor blade 141 are horizontally oriented with respect to the ground surface 200.

The sickle mower blade 140 and the stationary mower blade 141 work together in order to cut grass 300 when the wheel drive system 110 is pulling the sickle mower blade 140 as well as the stationary mower blade 141 along the rail 101.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An automated grass cutter comprising:
   a rail onto which a drive wheel system engages thereon so as to propel both the drive wheel system and a sickle mower blade;
   wherein the rail is supported in place via fence posts;
   wherein the rail is further defined with a top surface, bottom surface, inner surface, and outer surface; wherein the rail is generally squared-shaped, and is of an undefined length;
   wherein the rail is constructed of individual rail segments that attach to one another via a male end and corresponding female end provided on distal ends of each of the rail segments;
   wherein the rail is held in place via the fence posts; wherein the fence posts are configured to be inserted into a ground surface, and include a rail arm that is perpendicularly oriented with respect to the fence post;
   wherein the drive wheel system includes a series of inner guide wheels as well as a series of outer guide wheels; wherein the inner guide wheels engage the inner surface of the rail whereas the outer guide wheels engage against the outer surface of the rail; wherein the outer guide wheels include an outer bracket that linearly connect to all of the outer guide wheels;

wherein the inner guide wheels include an inner bracket that connects across all of the inner guide wheels; wherein the drive wheel system includes a drive wheel that is engaged against two adjacent outer guide wheels;

wherein the drive wheel is responsible for propelling the drive wheel system along the rail; wherein the drive wheel is in mechanical connection with a drive motor via a drive wheel belt; wherein a plurality of spring members traverse between the inner guide wheels and the outer guide wheels to insure adequate contact of the drive wheel system to the rail; wherein the spring members ensure that the inner guide wheels and the outer guide wheels are able to maintain traction to the rail; wherein the spring members span across and above the rail so as to not interfere with the rail arms that are periodically spaced along the length of the rail.

2. The automated grass cutter as described in claim 1 wherein the fence post and the rail arm support the rail at an elevation above the ground surface.

3. The automated grass cutter as described in claim 2 wherein the rail spans between two consecutive fence posts.

4. The automated grass cutter as described in claim 1 wherein the drive wheel belt extends from a drive motor shaft to a drive wheel shaft; wherein the drive motor shaft extends down from the drive motor to a sickle blade gear, which is positioned underneath the drive wheel system.

5. The automated grass cutter as described in claim 4 wherein the sickle blade gear attaches to a sickle idler arm; wherein the sickle idler arm is responsible for translating rotational motion of the sickle blade gear to a back and forth motion; wherein the sickle idler arm connects to a sickle mower blade such that the sickle idler arm moves the sickle mower blade back and forth whilst a stationary mower blade remains motionless; wherein the sickle mower blade and the stationary mower blade are supported via a mower blade brace.

6. The automated grass cutter as described in claim 5 a guard supports both the sickle mower blade and the stationary mower blade; wherein the guard is positioned in front of the sickle mower blade and the stationary mower blade.

7. The automated grass cutter as described in claim 6 a mower wheel is provided at a distal end of the sickle mower blade and the stationary mower blade; wherein the mower wheel is included to insure proper support of the sickle mower blade and the stationary mower blade; wherein the motor wheel ensures that the sickle mower blade and the stationary motor blade are horizontally oriented with respect to the ground surface.

8. An automated grass cutter comprising:

a rail onto which a drive wheel system engages thereon so as to propel both the drive wheel system and a sickle mower blade;

wherein the rail is supported in place via fence posts;

wherein the rail is further defined with a top surface, bottom surface, inner surface, and outer surface; wherein the rail is generally squared-shaped, and is of an undefined length;

wherein the rail is constructed of individual rail segments that attach to one another via a male end and corresponding female end provided on distal ends of each of the rail segments;

wherein the rail is held in place via the fence posts; wherein the fence posts are configured to be inserted into a ground surface, and include a rail arm that is perpendicularly oriented with respect to the fence post;

wherein the fence post and the rail arm support the rail at an elevation above the ground surface;

wherein the rail spans between two consecutive fence posts;

wherein the drive wheel system includes a series of inner guide wheels as well as a series of outer guide wheels;

wherein the inner guide wheels engage the inner surface of the rail whereas the outer guide wheels engage against the outer surface of the rail; wherein the outer guide wheels include an outer bracket that linearly connect to all of the outer guide wheels;

wherein the inner guide wheels include an inner bracket that connects across all of the inner guide wheels; wherein the drive wheel system includes a drive wheel that is engaged against two adjacent outer guide wheels;

wherein the drive wheel is responsible for propelling the drive wheel system along the rail; wherein the drive wheel is in mechanical connection with a drive motor via a drive wheel belt; wherein a plurality of spring members traverse between the inner guide wheels and the outer guide wheels to insure adequate contact of the drive wheel system to the rail; wherein the spring members ensure that the inner guide wheels and the outer guide wheels are able to maintain traction to the rail; wherein the spring members span across and above the rail so as to not interfere with the rail arms that are periodically spaced along the length of the rail.

9. The automated grass cutter as described in claim 8 wherein the drive wheel belt extends from a drive motor shaft to a drive wheel shaft; wherein the drive motor shaft extends down from the drive motor to a sickle blade gear, which is positioned underneath the drive wheel system.

10. The automated grass cutter as described in claim 9 wherein the sickle blade gear attaches to a sickle idler arm; wherein the sickle idler arm is responsible for translating rotational motion of the sickle blade gear to a back and forth motion; wherein the sickle idler arm connects to a sickle mower blade such that the sickle idler arm moves the sickle mower blade back and forth whilst a stationary mower blade remains motionless; wherein the sickle mower blade and the stationary mower blade are supported via a mower blade brace.

11. The automated grass cutter as described in claim 10 a guard supports both the sickle mower blade and the stationary mower blade; wherein the guard is positioned in front of the sickle mower blade and the stationary mower blade.

12. The automated grass cutter as described in claim 11 a mower wheel is provided at a distal end of the sickle mower blade and the stationary mower blade; wherein the mower wheel is included to insure proper support of the sickle mower blade and the stationary mower blade; wherein the motor wheel ensures that the sickle mower blade and the stationary motor blade are horizontally oriented with respect to the ground surface.

* * * * *